United States Patent [19]
Hsu et al.

[11] Patent Number: 5,574,891
[45] Date of Patent: Nov. 12, 1996

[54] METHOD FOR MANAGING THE INPUT CODES FROM KEYBOARD AND POINTING DEVICE

[75] Inventors: Hung-Chang Hsu; Jui-Ho Chen, both of Taoyuan, Taiwan

[73] Assignee: Acer Peripherals, Inc., Taoyuan, Taiwan

[21] Appl. No.: 312,995

[22] Filed: Sep. 27, 1994

[51] Int. Cl.⁶ .................................................. G09G 3/02
[52] U.S. Cl. .......................................... 395/500; 345/168
[58] Field of Search ........................... 395/500; 340/711, 340/710, 704, 706; 364/709.11

[56] References Cited

U.S. PATENT DOCUMENTS

| | | | |
|---|---|---|---|
| 5,124,689 | 6/1992 | Franz et al. | 340/711 |
| 5,189,403 | 2/1993 | Franz et al. | 340/711 |
| 5,245,321 | 9/1993 | Franz et al. | 345/172 |
| 5,269,004 | 12/1993 | Comerford et al. | 395/275 |

*Primary Examiner*—Kevin J. Teska
*Assistant Examiner*—Stephen J. Walder, Jr.
*Attorney, Agent, or Firm*—Fish & Richardson P.C.

[57] ABSTRACT

A method for managing the input codes from the keyboard and the point device and an apparatus thereof are provided. When the computer system is not coupled to a PS/2 mouse and a hybrid keyboard is found to be connected to the computer system, the method first requests the hybrid keyboard to send a leading code designated to the pointing device. Afterwards, the method detects whether an input code from the hybrid keyboard has a leading code. And if there is a leading code, the method emulates the input code as a PS/2 mouse code and sends the emulated PS/2 mouse code to the computer system.

4 Claims, 6 Drawing Sheets

METHOD FOR MANAGING THE INPUT CODES FROM KEYBOARD AND POINTING DEVICE

BACKGROUND OF THE INVENTION

This invention relates to an input-code managing method and, more particularly, to a method for managing the input codes from the keyboard and the pointing device.

For computer system, there are a plurality of input devices with the typical ones being the keyboard and the pointing device. In order to save the space the input devices occupy and to reduce the overall manufacture cost, it has been successfully to incorporate those two input devices into one, and this resultant input device is commonly called "Hybrid keyboard" in the art. With the presently existing hybrid keyboards in the market, software incompatibility exists.

As shown in FIG. 1, a hybrid keyboard with brandname "HOME ROW" includes a keyboard 11 and a pointing device 12. The hybrid keyboard communicates with the keyboard controller 13 of the computer system through the signal line 10. The input data from the keyboard 11 or the pointing device 12 are received by the computer respectively when the INT 9H (14) and INT 16H (15) are called or when the INT 9H (14) and the INT 33H (16) are called. The input data or information to be retrieved by the INT 16H and the INT 33H are stored in the keyboard ring buffer 17 and the pointing device buffer 18 respectively by the service routine of the INT 9H. It is well known in the art, the INT 9H is the keyboard interrupt of the Basic Input/Output System (BIOS) of IBM compatible computer system, the INT 16H is provided to process the input from the keyboard and the INT 33H is provided to the application programs for retrieving the position and status of the mouse. The "HOME ROW" hybrid keyboard involves using a leading code to identify the input codes from the pointing device and emulating the input codes as a mouse code. Furthermore, the conventional service routine (keyboard handler) of INT 9H is modified to manage the inputs from the Hybrid keyboard, i.e., to manage the input codes from the keyboard 11 and the pointing device 12.

The aforesaid "HOME ROW" hybrid keyboard can be concluded with the following defects.

1. The conventional keyboard handler must be modified or adapted to manage the input codes from the pointing device 12, and, accordingly, the software incompatibility becomes the major problem.

2. Since a mouse code is emulated by the "HOME ROW" keyboard handler, a specific mouse driver provided by the HOW ROW keyboard maker shall be used. And the generally available mouse drivers in the market can not be used compatibly with the "HOW ROW" hybrid keyboard.

As shown in FIG. 2, a hybrid keyboard with brandname "LEXMARK" includes the pointing device 12 coupled mechanically with the keyboard 11. Through the signal lines 10, 20 respectively the keyboard 11 and the pointing device 12 are connected to the keyboard controller 13 of the computer system. The input data from the keyboard 11 or the pointing device 12 are received by the computer system respectively when the INT 9H (14) and INT 16H (15) are called or when the INT 74H (19) and the INT 33H (16) are called. The input data or information to be retrieved by the INT 16H and the INT 33H are stored in the keyboard ring buffer 17 and the pointing device buffer 18 respectively by the service routines of the INT 9H and the INT 74H. It is well known in the art, the INT 9H is the keyboard interrupt of the Basic Input/Output System (BIOS) of IBM compatible computer system, the INT 16H is provided to process the input from the keyboard 11, the INT 33H is provided to the application programs for retrieving the position and status of the mouse and the INT 74H is provided to the application programs for retrieving the position and status of the PS/2 mouse.

As a matter of fact, the LEXMARK hybrid keyboard is an integral input device with two independent input devices. Although the software incompatibility may be avoided under LEXMARK configuration, these two independent input devices must be connected to the keyboard controller 13 through separate signal lines 10, 20 which does not save space than the conventional approach and has no benefit on cost down of the overall manufacturing cost.

SUMMARY OF THE INVENTION

It is the object of this invention to provide a method which uses the leading code to identify the input from the pointing device and emulates the pointing device as a PS/2 mouse. The program of the conventional keyboard controller, such as the 8042IC, is then modified or adapted to manage the input codes from the keyboard and the pointing device.

It is still the object of this invention to provide a method wherein only the program of the keyboard controller is modified and, accordingly, the software incompatibility is completely avoided while only one connection line is necessary to couple the hybrid input device with the computer. The mouse driver available in the market may be used with the hybrid keyboard implementing the invention.

In order to achieve the objects set forth, the method for managing the input codes of the keyboard and the pointing device comprising:

1) detecting the Basic Assurance Test (BAT) code from the keyboard to determine whether the keyboard is a hybrid keyboard;
2) if a hybrid keyboard is detected by step 1, requesting the hybrid keyboard to send a leading code designated for the pointing device coupled to the hybrid keyboard;
3) detecting whether the input code from the hybrid keyboard has a leading code; and
4) if the result of the step 3 is YES, emulating the input code as the PS/2 mouse code and sending the emulated code to computer system.

The structural and operational characteristics of the present invention and its advantages as compared to the known state of the prior art will be better understood from the following detailed description, in conjunction with the attached drawings which show, illustratively but not restrictively, an preferred embodiment of a method for managing the input code from the keyboard and the pointing device.

DETAILED DESCRIPTION OF PREFERRED EMBODIMENT

Figure 1:
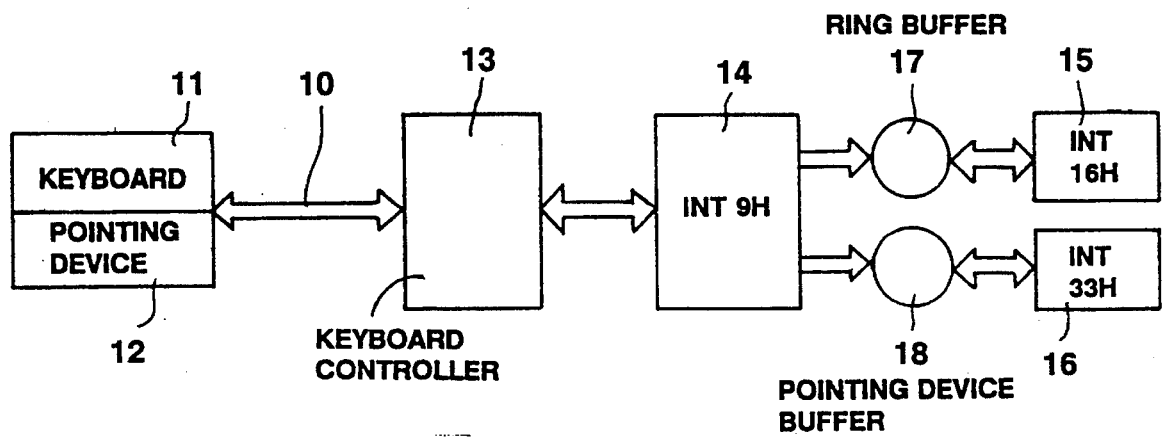
FIG. 1 shows connection between a conventional HOME ROW hybrid keyboard and a computer system and the mechanism by which computer system receives the input from the HOW ROW hybrid keyboard.
Figure 2:
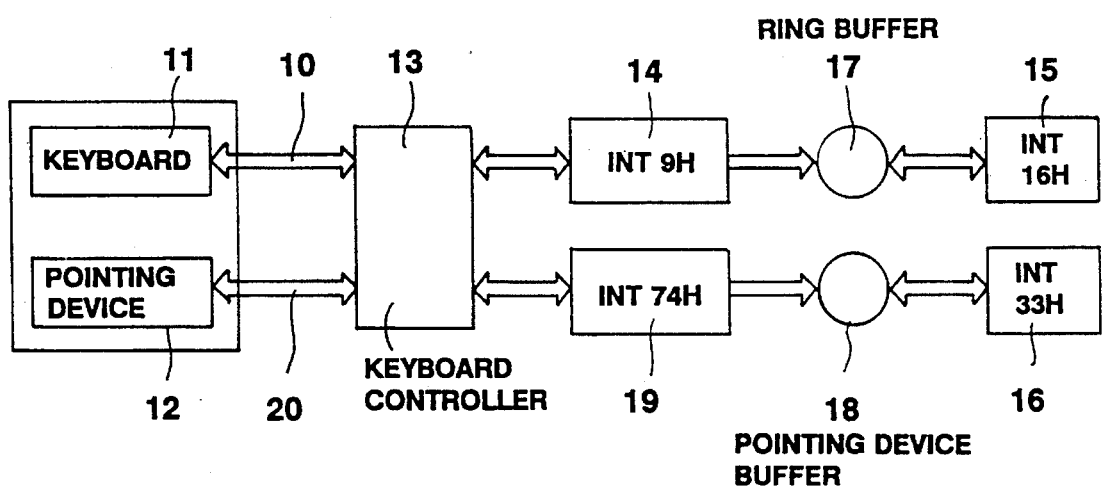
FIG. 2 shows connection between a conventional LEXMARK hybrid keyboard and a computer system and the mechanism by which computer system receives the input from the LEXMARK hybrid keyboard.
Figure 3:
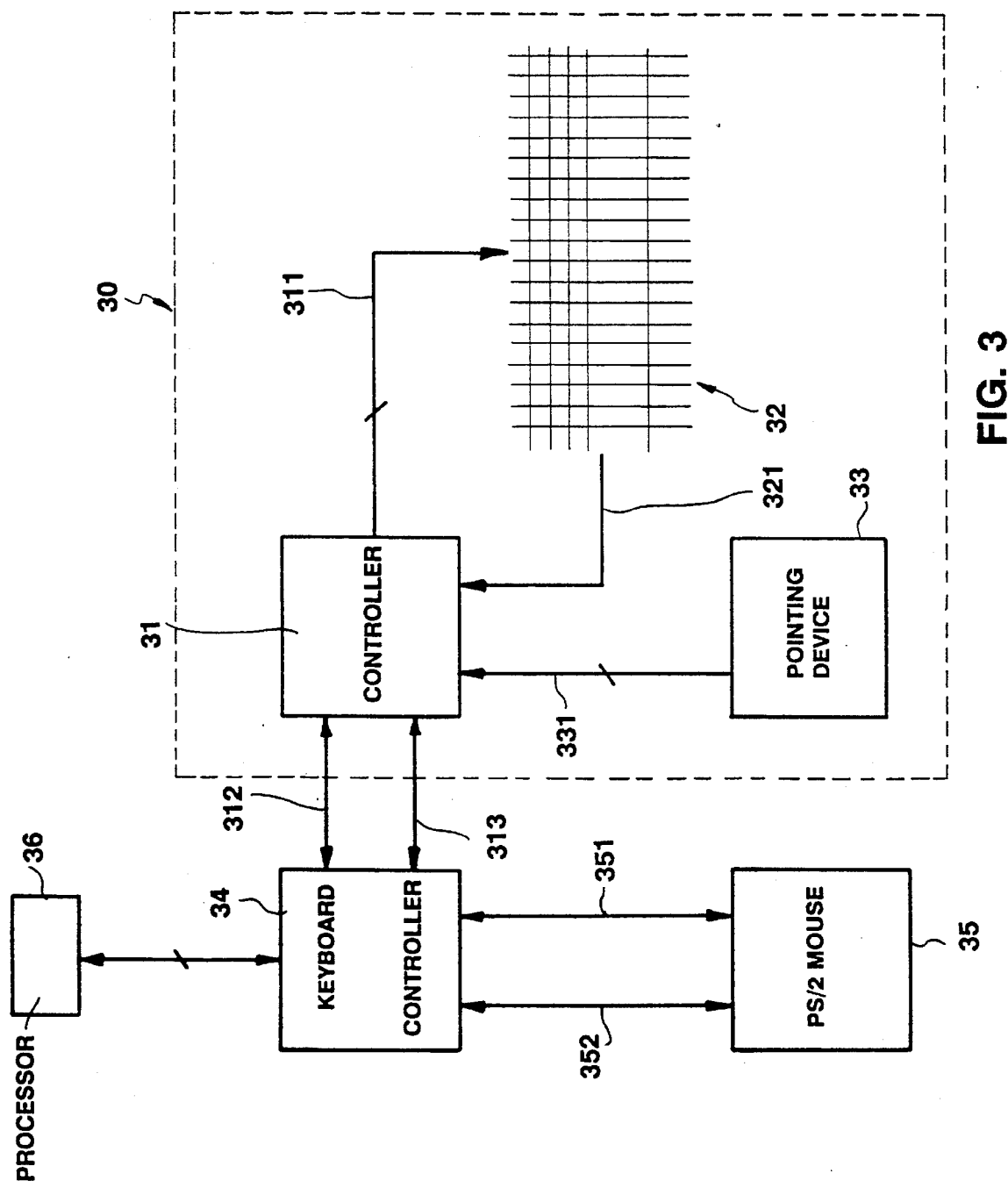
FIG. 3 is a hardware configuration of a first kind of a hybrid keyboard which may corporate with the method of the present invention.

Referring to FIG. 3, the hardware configuration of the first type 30 of a hybrid keyboard, which may corporate with the method of the present invention, includes a controller 31, a keyboard matrix 32 and a pointing device 33. The pointing device 33 may be in the form of a digitizer, a track ball or a mouse, etc., which generates a cursor on the display monitor. The controller 31 may be the typical 8048 or 8051 chip. By the scan line 311 and the sense line 321, the controller 31 knows which key has been depressed or released. On the other hand, by the signal line 331, the relative movement and the actuation of the buttons of the pointing device 33 are detected by the controller 31. With respect to the overall configuration, the hybrid keyboard 30 communicates with the keyboard controller 34 on the computer system through the signal lines 312 (CLK) and signal lines 313 (DATA). If a PS/2 mouse 35 is connected with the computer system, then data communication between them is effected through the signal lines 351 (DATA) and the signal lines 352 (CLK). The block 36 represents the main processor of the computer system. Typically, the keyboard controller 34 used is 8042IC.

Figure 4:
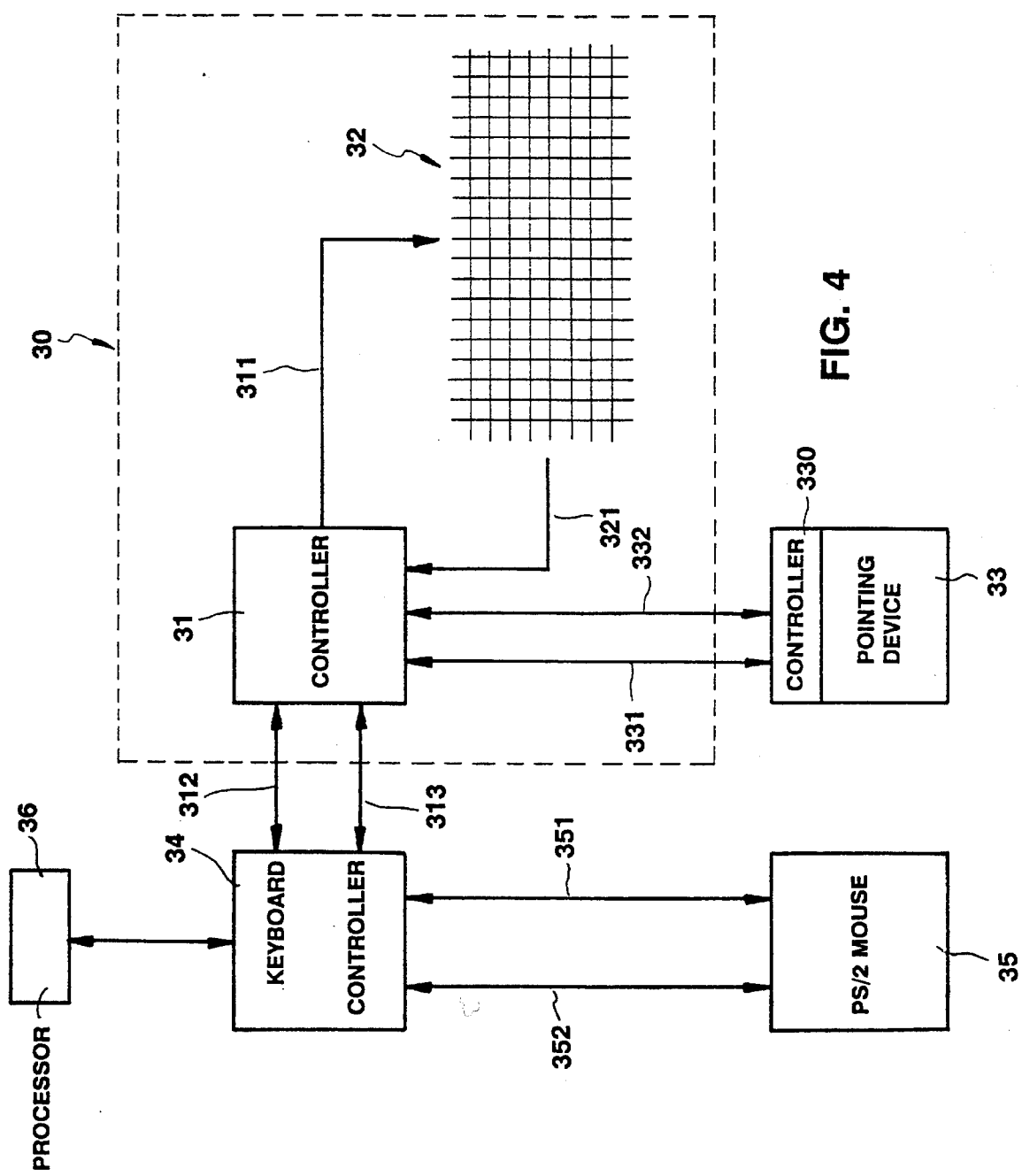
FIG. 4 is a hardware configuration of a second kind of a hybrid keyboard which may corporate with the method of the present invention.

Referring to FIG. 4, the hardware configuration of the second type 30 of a hybrid keyboard, which may corporate with the method of the present invention, includes a controller 31, a keyboard matrix 32. The difference between the configurations of FIGS. 3 and 4 is the pointing device 33 of FIG. 4, which is not built integrally within the hybrid keyboard 30, being an external device connected to the hybrid keyboard 30 through a connector and the signal lines 331, 332. In this configuration, the pointing device 33 has a proprietary controller 330. Other elements and the associated connections are identical with those of the configuration disclosed in FIG. 3.

Figure 5A:
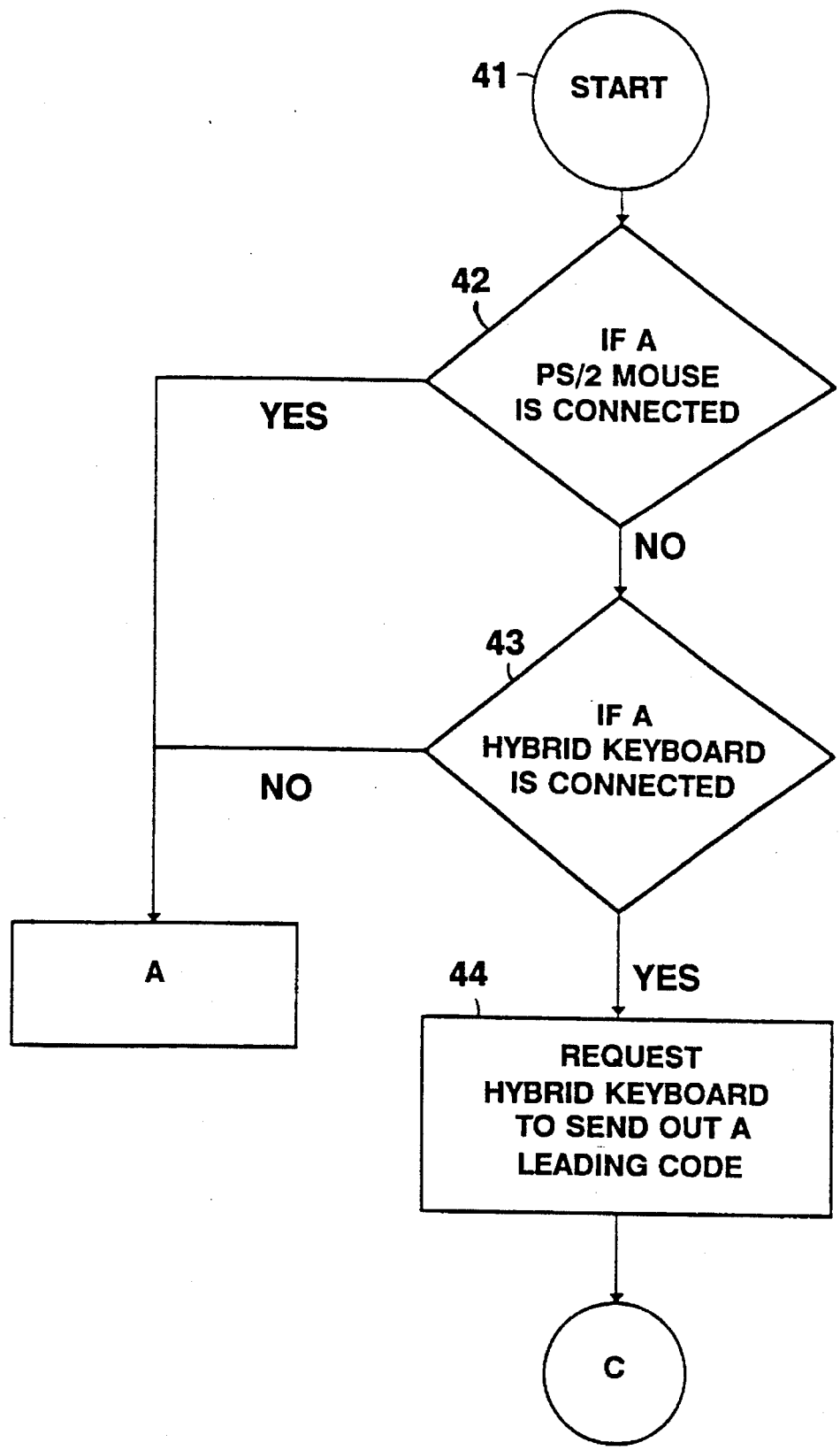
FIGS. 5A and B show a flow chart of the method provided by the present invention.
Figure 5B:
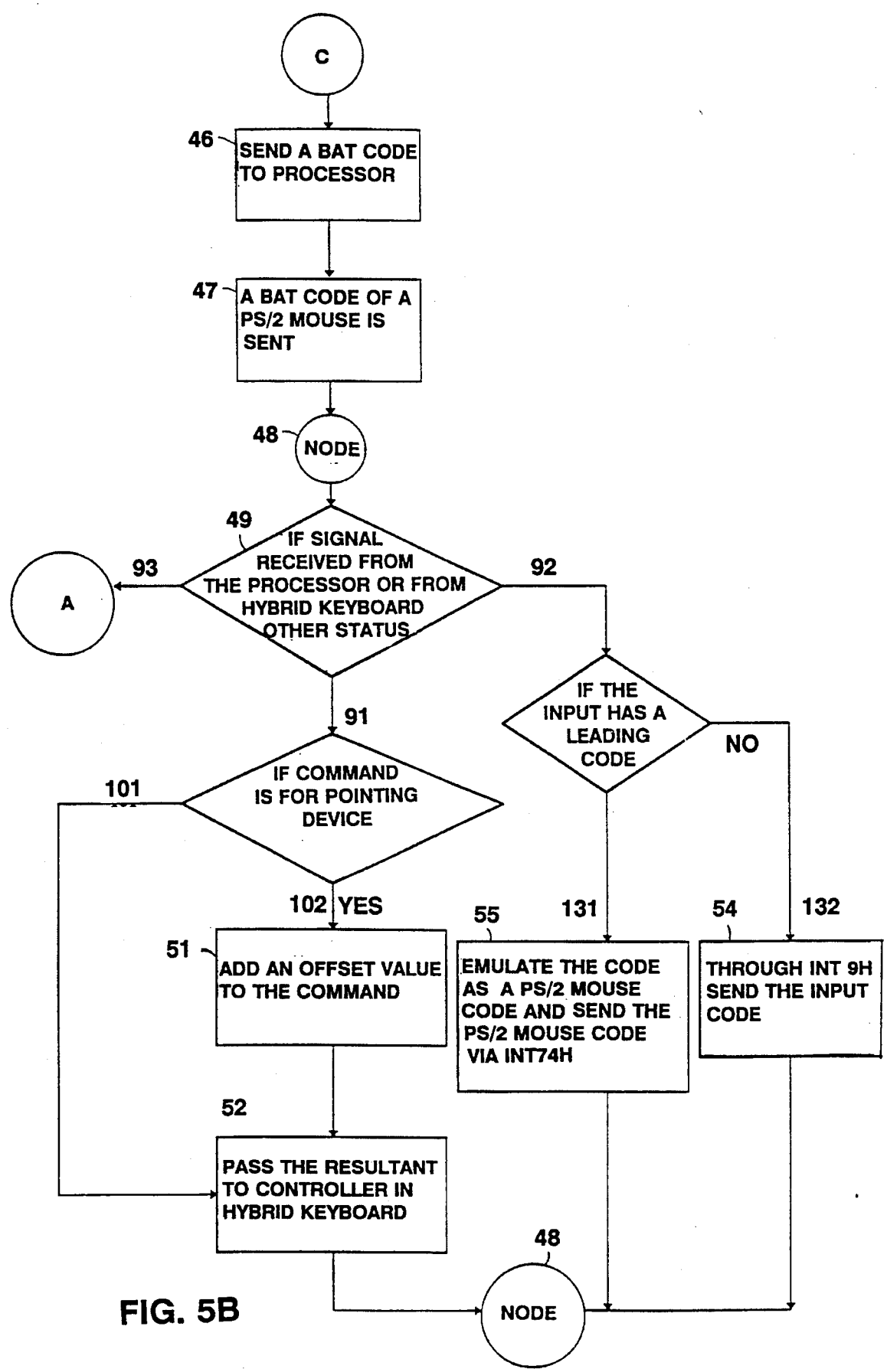

Referring to FIG. 5, the flow chart shows the sequence of the method provided by this invention. The steps of the method are performed by the keyboard controller 34.

Step 41 is the beginning. Step 42 determines whether the keyboard controller 34 is coupled to a PS/2 mouse 35. If the result is YES, then the keyboard controller 34, in block A, ignores other pointing device 33 if there is one, and performs the steps of a conventional keyboard controller does in a well known manner. In other words, the steps of the method of the present invention will not be carried out.

If a PS/2 mouse 35 is not connected, then in the step 43, this invention determines whether a hybrid keyboard 30 is connected to the keyboard controller 34. If the result is NO, then the keyboard controller 34 performs the procedures of a conventional keyboard controller does in a well known manner in the block A.

If a hybrid keyboard 30 is connected, then in step 44, the keyboard controller 34 requests the hybrid keyboard 30 to send a leading code designated for the input code from the pointing device 33.

Subsequently, the keyboard controller 34, in step 46, sends a Basic Assurance Test(BAT) code to processor 36. In step 47, a BAT code of a PS/2 mouse is sent to processor 36.

The procedures after the node 48 are the procedures of the keyboard controller 34 by which communications between the hybrid keyboard 30 and the processor 36 are accomplished.

In step 49, the keyboard controller 34 determines whether the signal received is a command sent from the processor 36 or the input code from the hybrid keyboard 30 or other status. If it is other request(route 93), the procedure goes to the block A in which conventional steps serving these requests are performed in a well known manner.

If it is the command from the processor 36 (route 91), then, in step 50, determination is made on whether the command is for the pointing device 33. If the command is not for pointing device 33 (route 101), then this command is directly sent to the controller 31 within the hybrid keyboard 30 and the procedure returns to node 48 afterwards.

If it is a command to the pointing device 33 in step 50 (route 102), the invention, in step 51, first adds a predetermined offset value, such as (−20h), to this command and passes the resultant to the controller 31 within the hybrid keyboard 30 in step 52. Afterwards, the procedure goes to the node 48.

If the result in step 49 is an input code from hybrid keyboard 30 (route 92), a determination of whether the input code has a leading code is made in step 53. If the result is YES (route 131) representing the input code is coming from the pointing device 33, in step 55, the invention emulates the code as a PS/2 mouse code and sends the PS/2 mouse code to processor 36 through INT 74H. Afterwards the procedure goes to node 48.

If no leading code is found (route 132) representing the input code is coming from the keyboard matrix 32 per se, the input code is sent to processor 36 through INT 9H in the step 54. Afterwards the procedure goes to node 48.

The transmission of the command, data between the hybrid keyboard 30, keyboard controller 34 and the processor 36 is described below with reference to FIG. 6.

Figure 6:
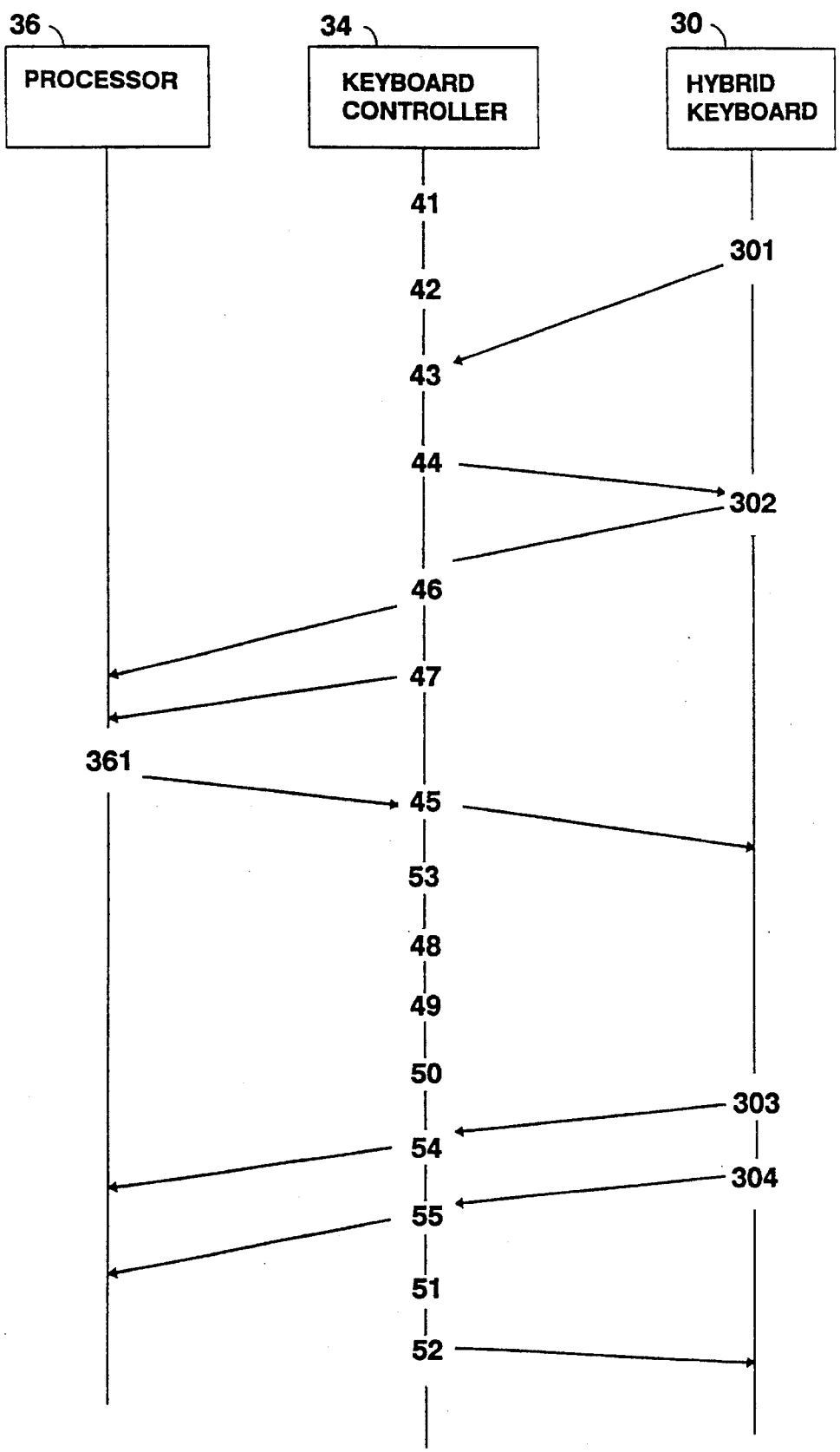
FIG. 6 illustrates the transmission of the command, data between the keyboard, keyboard controller and the computer in association with the operation of the invention.

In FIG. 6, after the processor 36, the keyboard controller 34 and the hybrid keyboard 30 are powered on, the hybrid keyboard 30 sends a BAT code to keyboard controller 34 through step 301. For instance, this BAT code may be a AAh followed by another AAh. By this step, the keyboard controller 34 would know a hybrid keyboard 30 is connected.

Subsequently, the keyboard controller 34 in step 44 requests the hybrid keyboard 30 to send a leading code designated to the input code from the pointing device 33. The hybrid keyboard 30 in step 302 sends the leading code to the keyboard controller 34.

Afterwards, a BAT code is sent to the processor 36 by the keyboard controller 34 in step 46. Under the standard specification of the IBM PC, this BAT code is AAh. After that, a BAT code of the PS/2 mouse, which is AAh, 00h under the standard specification of the IBM PC, is sent to the processor 36 by the keyboard controller 34 in step 47. The object of the step 46 and 47 are to inform the processor 36 of the configuration of the input devices.

Afterwards, the processor 36 in step 361 instructs the keyboard controller 34 to enable the PS/2 mouse. The keyboard controller 34 then in step 45 enables the pointing device 33 coupled to the hybrid keyboard 30 and emulates the pointing device 33 as a PS/2 mouse from this moment on.

The keyboard controller 34 in step 49 detects at all times whether there comes an input signal.

When the hybrid keyboard 30 sends a keyboard code without the designated leading code to the keyboard controller 34 through step 303, the keyboard controller 34 calls the INT 9H in step 54 and the input code is sent to the processor 36.

When a keyboard code having the designated leading code is sent to the keyboard controller 34 by the hybrid keyboard 30 through the step 304, the keyboard controller 34 emulates this code as a PS/2 mouse code and calls INT 74H to send this emulated PS/2 mouse code to the processor 36.

From above descriptions, it is known the procedures provided by this invention are performed by keyboard controller 34. On the other hand, the controller 31 within the hybrid keyboard 30 shall be capable of carrying out the following steps. 1) in step 301, sending an identification code, e.g. AAh, AAh, of the hybrid keyboard 30 to the keyboard controller 34; 2) in step 302, informing the keyboard controller 34 of the leading code designated for the input code from the pointing device 33; and 3) in step 304, adding the designated leading code on the input code from the pointing device 33.

The present invention has been described in depth by an illustrative preferred embodiment, and it is to be understood that many other variations and modifications to those skilled in the art are likely without departing from the scope of the invention which is defined by the following claims.

What is claimed is:

1. In a computer system having a keyboard controller, the keyboard controller having a first input/output port and a second input/output port adapted to couple to a keyboard and a PS/2 mouse respectively, a method for managing the input codes from the keyboard, comprising the steps of:

(1) detecting if the keyboard controller is connected to a PS/2 mouse;

(2) if the result in step (1) is NO, detecting a Basic Assurance Test (BAT) code from the keyboard to determine whether the keyboard coupled is a hybrid keyboard, the hybrid keyboard including a keyboard device and a pointing device;

(3) if a hybrid keyboard is detected in step (2), requesting the hybrid keyboard to send a leading code designated to the pointing device;

(4) detecting whether a signal received by the keyboard controller is a command sent from the computer system or an input code from the hybrid keyboard;

(5) if, in step (4), the signal received by the keyboard controller is the input code from the hybrid keyboard, detecting whether an input code from the hybrid keyboard has the designated leading code;

(6) if the result of the step (5) is YES, emulating the input code as a PS/2 mouse code and sending the emulated PS/2 mouse code to the computer system.

2. The method as recited in claim 1, wherein, further comprising steps of:

(7) if, in step (4), the signal detected is the command from the computer system, detecting if the command is to the pointing device;

(8) if the result is YES in step (7), outputing a code which is obtained by adding a predetermined offset value to the command.

3. An input apparatus of a computer system, the input apparatus having a keyboard controller which has a first input/output port and a second input/output port adapted to couple to a keyboard and a PS/2 mouse respectively, the keyboard controller performs the steps of:

(1) detecting if the keyboard controller is connected to a PS/2 mouse;

(2) if the result in step (1) is NO, detecting a Basic Assurance Test (BAT) code from the keyboard to determine whether the keyboard coupled is a hybrid keyboard, the hybrid keyboard including a keyboard device and a pointing device;

(3) if a hybrid keyboard is detected in step (2), requesting the hybrid keyboard to send a leading code designated to the pointing device;

(4) detecting whether a signal received by the keyboard controller is a command sent from the computer system or an input code from the hybrid keyboard;

(5) if, in step (4), the signal received by the keyboard controller is the input code from the hybrid keyboard, detecting whether an input code from the hybrid keyboard has the designated leading code;

(6) if the result of the step (5) is YES, emulating the input code as a PS/2 mouse code and sending the emulated PS/2 mouse code to the computer system.

4. The apparatus as recited in claim 3, wherein, the keyboard controller performs the steps of:

(7) if, in step (4), the signal detected is the command from the computer system, detecting if the command is to the pointing device;

(8) if the result is YES in step (7), outputing a code which is obtained by adding a predetermined offset value to the command.

* * * * *